UNITED STATES PATENT OFFICE.

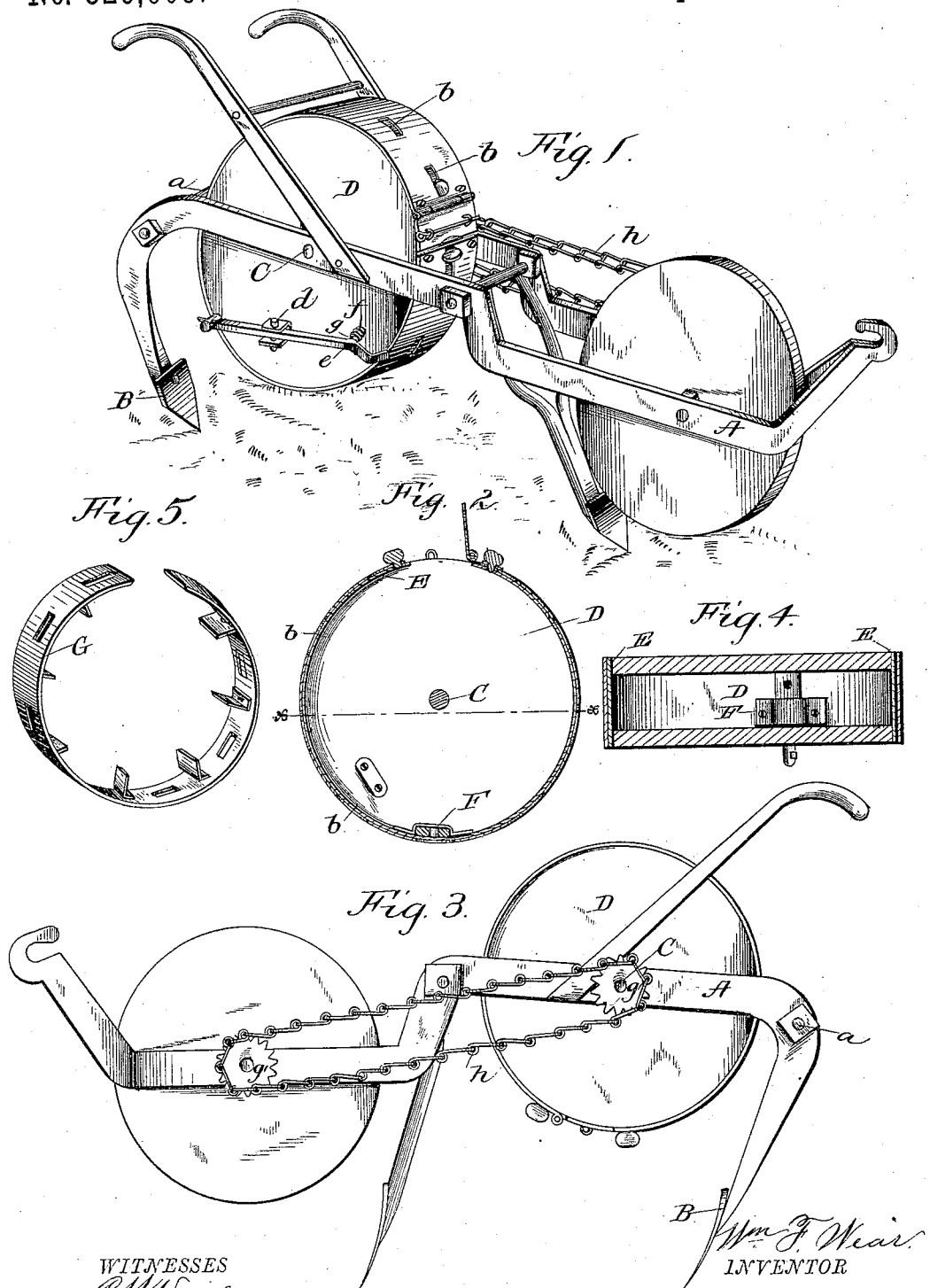

WILLIAM FOSTER WEAR, OF BUFFALO SPRINGS, TEXAS.

CORN AND COTTON PLANTER.

SPECIFICATION forming part of Letters Patent No. 326,609, dated September 22, 1885.

Application filed July 18, 1884. (No model.)

*To all whom it may concern:*

Be it known that I, WILLIAM F. WEAR, a citizen of the United States, residing at Buffalo Springs, in the county of Clay and State of Texas, have invented a new and useful Improvement in Corn and Cotton Planters, of which the following is a specification, reference being had to the accompanying drawings.

My invention relates to a combined corn and cotton planter; and it has for its object to provide an improved hopper for containing the seed, and an improved slide or cut-off, and means for automatically operating the same.

A further object of the invention is to provide a planter which shall be cheap and simple in its construction, effective in its operation, and durable in use.

With these ends in view the invention consists in the improved construction and combination of parts hereinafter fully described, and pointed out in the claims.

In the drawings, Figure 1 is a perspective view of a combined corn and cotton planter constructed in accordance with my invention. Fig. 2 is a longitudinal vertical section of the hopper or drum. Fig. 3 is a side elevation. Fig. 4 is a horizontal section on the line $x\ x$ of Fig. 2, and Fig. 5 is a detail view of the cotton-seed agitator.

In the accompanying drawings, in which like letters of reference indicate corresponding parts in all the figures, A represents the frame, having the carrying-wheel mounted between the sides at the forward end thereof. The ends of the sides are provided with a hook for the attachment of a single-tree. Just in rear of the carrying-wheel is mounted, between the sides, a furrow-opener of the usual construction. The rear ends of the sides are bent downwardly, as shown, and are provided with coverers B, the sides of the frame being braced at their rear ends adjacent to the furrow-openers by a transverse rod, $a$.

C represents a shaft mounted between the sides of the frame in rear of the furrow-opener. The ends of this shaft are round; but the shaft is square for the rest of its length. Upon this shaft is mounted the hopper or drum D, which is cylindrical in form. The peripheral edge or face of this drum is preferably of sheet metal, and is provided at suitable intervals with openings $b$. At any desired point upon the face of this drum is provided a hinged cover, by which means access to the interior of the drum may be readily had for any purpose whatever.

In planting corn it is only necessary to employ one opening to drop the seed. Therefore I have provided, on the inner side of the sheet-metal face, a strip of metal, E, which has an opening corresponding with any one of the series of openings on the sheet-metal face of the seed-drum. At each end of the metal strip E is provided an opening or perforation. Passing through the seed-openings of the drum are set-screws which work in the openings in the ends of the sheet-metal strip and thus securely hold the same in place. Upon the sheet-metal strip is provided a bracket or guide, F, which covers the opening in said strip, allowing, however, sufficient space between itself and the said strip to permit the working of a seed-slide therein. As the seed-slide entirely fills the space between the strip and the bracket, or rather its end closes the opening to the same, it will be seen that it will be necessary for the seed to be carried into the guide before it can be dropped. For this purpose I have provided the slide with a recess or cup to receive the seed, so that, as said slide is actuated, the seed will be carried within the bracket or guide and will then drop through the openings of the strip and face of the drum.

The mechanism for operating the seed-slide is as follows: The end of the slide is provided with a shaft which extends out of and beyond the drum. Rigidly connecting with said shaft is a lever, which is pivoted between two brackets secured to the side of said casing or drum by means of a pin, $d$. The end of this lever is bent to form an L-shaped arm, and adjacent to this arm upon the lever is provided an opening, $e$, which is adapted to receive a pin projecting out from the drum. Interposed between the side of the drum and the inner side of said lever is a coil-spring, $f$, which is mounted on the pin $g$, the drum being recessed to form a seat for said coil-spring at its inner end. It will be seen that by providing the coil-spring between the free end of the lever and the drum said free end will be forced outward, as shown in Fig. 1, so that the drum in revolving will cause the end of the L-shaped lever to strike one of the sides and be depressed, which action will draw the seed into the guide or bracket and drop the same.

The means for revolving the drum are as follows: The ends of the carrying-wheel shaft and the drum-shaft are extended beyond the sides of the frame and are provided at their ends with sprocket-wheels $g'$, which are adapted to receive a drive or sprocket chain, $h$. It will be observed that as the carrying-wheel is revolved motion will be imparted to the drum by means of the connection above mentioned.

In planting cotton the sheet-metal strip carrying the bracket or guide and seed-slide is removed, and the lever upon the side of the drum is also detached. I then adjust within the drum a strip having openings to correspond with the openings upon the face of the drum, and secure the said strip in place within the drum. The strip G is provided at suitable points upon its inner side or face with inwardly-extending wings, which serve to agitate the cotton-seed and prevent the same from packing. It will be seen that as the drum revolves the seed will drop as each opening reaches a point on a line perpendicular with the drum.

A planter constructed in accordance with my invention is simple in its construction, may be manufactured and supplied at a slight cost, and the means for dropping the corn are both simple and effective.

Having fully described my invention, I claim—

1. The combination, with the hopper, of a seed-slide and an arm pivoted centrally upon the other side of the hopper and connected with the seed-slide, said slide having its other end bent, as described, and a spiral spring located between said end and the hopper, as set forth.

2. The combination, with a revolving hopper having a series of openings upon its peripheral face, of a removable strip having a series of openings and inwardly-extending wings, thumb-screws for holding said strip in position, and a hinged door for the hopper, and a seed-slide located within said hopper, substantially as set forth.

3. The combination, with a revolving hopper having a seed-opening, a bracket or guide located over said opening and provided with a seed perforation or opening, said lever also having a shaft extending outside of the hopper, of a lever pivoted in brackets and rigidly connected to said shaft, a pin projecting outwardly from the hopper and fitting an opening in said lever, a coil-spring mounted on said pin between the hopper and lever, said lever having its free end bent to form an L-shaped arm or extension, substantially as set forth.

In testimony that I claim the foregoing as my own I have hereto affixed my signature in presence of two witnesses.

WILLIAM F. WEAR.

Witnesses:
THOMAS DOHERTY,
BENJAMIN F. TUNER.